(12) United States Patent
Joscelyne et al.

(10) Patent No.: US 10,713,377 B2
(45) Date of Patent: Jul. 14, 2020

(54) SYSTEM OF SHARED SECURE DATA STORAGE AND MANAGEMENT

(71) Applicant: IXUP IP Pty Ltd, Sydney, New South Wales (AU)

(72) Inventors: Dean Joscelyne, Sydney (AU); Rhona Marks, Sydney (AU)

(73) Assignee: IXUP IP PTY LTD, Sydney, New South Wales (AU)

( * ) Notice: Subject to any disclaimer, the term of this patent is extended or adjusted under 35 U.S.C. 154(b) by 100 days.

(21) Appl. No.: 15/776,727

(22) PCT Filed: Nov. 18, 2016

(86) PCT No.: PCT/AU2016/051114
§ 371 (c)(1),
(2) Date: May 16, 2018

(87) PCT Pub. No.: WO2017/083927
PCT Pub. Date: May 26, 2017

(65) Prior Publication Data
US 2018/0357443 A1    Dec. 13, 2018

(30) Foreign Application Priority Data

Nov. 20, 2015  (AU) .............................. 2015904795

(51) Int. Cl.
G06F 21/62   (2013.01)
H04L 9/08    (2006.01)

(52) U.S. Cl.
CPC ...... *G06F 21/6227* (2013.01); *G06F 21/6245* (2013.01); *H04L 9/0822* (2013.01); *H04L 9/0825* (2013.01)

(58) Field of Classification Search
CPC ............. G06F 21/6227; G06F 21/6245; H04L 9/0822; H04L 9/0825
See application file for complete search history.

(56) References Cited

U.S. PATENT DOCUMENTS 8,639,920 B2   1/2014  Stack et al.
8,838,629 B2   9/2014  Dedeoglu et al.
(Continued)

OTHER PUBLICATIONS

Siegenthaler et al. Sharing Private Information Across Distributed Databases, 2009 Eighth IEEE International Symposium on Network Computing and Applications, Jul. 2009, pp. 82-89 (Year: 2009).*

(Continued)

*Primary Examiner* — Kenneth W Chang
(74) *Attorney, Agent, or Firm* — Finnegan, Henderson, Farabow, Garrett & Dunner, LLP

(57) ABSTRACT

This disclosure relates to sharing confidential data between a first data provider and a second data provider. A processor determines a correspondence between one of multiple first data records from the first data provider and one of multiple second data records from the second data provider. The multiple first data records are stored on a first data store accessible by the first data provider and protected by encryption from the second data provider. The multiple second data records are stored on a second data store accessible by the second data provider and protected by encryption from the first data provider. The processor creates a first reference to the one of the multiple first data records and a second reference to the one of the multiple second data records. The first reference is accessible by the second data provider and the second reference is accessible by the first data provider.

11 Claims, 17 Drawing Sheets

(56) References Cited

U.S. PATENT DOCUMENTS

| | | | |
|---|---|---|---|
| 2002/0073138 A1* | 6/2002 | Gilbert | G06F 21/6227 709/201 |
| 2002/0138722 A1* | 9/2002 | Douceur | H04L 9/0825 713/153 |
| 2003/0009368 A1* | 1/2003 | Kitts | G06Q 10/06 705/7.34 |
| 2004/0175000 A1* | 9/2004 | Caronni | G06F 21/6218 380/285 |
| 2006/0031301 A1* | 2/2006 | Herz | G06F 21/6254 709/206 |
| 2008/0147425 A1 | 6/2008 | Durvasula et al. | |
| 2010/0049803 A1* | 2/2010 | Ogilvie | G06F 21/6245 709/204 |
| 2011/0099202 A1* | 4/2011 | Dedeoglu | G06Q 30/02 707/780 |
| 2014/0052999 A1* | 2/2014 | Aissi | G06F 21/64 713/189 |
| 2014/0201007 A1* | 7/2014 | Stack | G06Q 10/10 705/14.66 |

OTHER PUBLICATIONS

International Search Report and Written Opinion of the International Searching Authority in PCT/AU2016/051114 (dated Feb. 2, 2017).

* cited by examiner

SYSTEM OF SHARED SECURE DATA STORAGE AND MANAGEMENT

CROSS-REFERENCE TO RELATED APPLICATIONS

The present application claims priority from Australian Provisional Patent Application No 2015904795 filed on 20 Nov. 2015, the content of which is incorporated herein by reference.

TECHNICAL FIELD

This disclosure relates to sharing confidential data. In particular, this disclosure relates to computer implemented methods and computer systems for facilitating the sharing of confidential data.

BACKGROUND

Companies with large customer databases often want to collaborate in order to mine their combined data. However, the customer data is confidential, which means the companies are not allowed to share their data or would lose a large number of customers who are concerned about their data being shared.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for sharing confidential data between a first data provider and a second data provider comprises:

determining a correspondence between one of multiple first data records from the first data provider and one of multiple second data records from the second data provider, the multiple first data records being stored on a first data store being accessible by the first data provider and protected by encryption from the second data provider, the multiple second data records being stored on a second data store being accessible by the second data provider and protected by encryption from the first data provider; and creating a first reference to the one of the multiple first data records and a second reference to the one of the multiple second data records, wherein the first reference is accessible by the second data provider and the second reference is accessible by the first data provider.

It is an advantage that the data records are protected from the parties that are not providers of those records. At the same time, both providers can access the references of corresponding data records. As a result, both providers can harvest information from the combined dataset without the records being disclosed to the other party.

The method may further comprise receiving an indication of one or more columns of the first and second data records, wherein determining the correspondence comprises determining a match of values in the one or more columns between the first data records and the second data records.

Creating the first reference and the second reference may comprise creating a third data record in a third data store, the third data record comprising the first reference and the second reference.

The method may further comprise storing one or both of:
in the first data store associated with the one of the multiple first data records the first reference; and
in the second data store associated with the one of the multiple second data records the second reference.

The method may further comprise storing one or both of:
in the first data store associated with the one of the multiple first data records an indication of a match type between the one of the multiple first data records and the one of the multiple second data records; and
in the second data store associated with the one of the multiple second data records an indication of a match type between the one of the multiple first data records and the one of the multiple second data records.

The method may further comprise:
receiving the multiple first data records;
encrypting the multiple first data records to obtain encrypted first data records that are protected from the second data provider; and
storing the encrypted first data records on the first data store.

Encrypting the multiple first data records may comprise using a first symmetric key that is protected from the first data provider and protected from the second data provider, and the first data records may accessible to the first data provider by checking the first data provider's credentials and decrypting the first data records using the first symmetric key.

The method may further comprise:
receiving the multiple second data records;
encrypting the multiple second data records to obtain encrypted second data records that are accessible by the second data provider and protected from the first data provider; and
storing the encrypted second data records on the second data store.

The method may further comprise:
receiving a query value from the first or the second data provider;
encrypting the query value using the first asymmetric key to determine an encrypted query value; and
performing a query for the encrypted query value over the encrypted first data records or the encrypted second data records.

Receiving the multiple first data records may comprise:
generating a key pair comprising a public key and a private key;
sending the public key to the first data provider;
receiving from the first data provider an encrypted second symmetric key that is encrypted using the public key;
decrypting the encrypted second symmetric key using the private key;
receiving from the first data provider encrypted first data records that are encrypted using the second symmetric key; and
decrypting the encrypted first data records using the second symmetric key.

Software, when executed by a computer, causes the computer to perform the above method.

A system for sharing confidential data between a first data provider and a second data provider comprises:

a first data store to store multiple first data records from the first data provider, the first data store being accessible by the first data provider and protected by encryption from the second data provider;

a second data store to store multiple second data records from the second data provider, the second data store being accessible by the second data provider and protected by encryption from the first data provider;

a processor having access to the first data store and the second data store to determine a correspondence between one of the multiple first data records and one of the multiple second data records, and to create a first reference to the one of the multiple first data records and a second reference to the one of the second data records, wherein the first reference is accessible by the second data provider and the second reference is accessible by the first data provider.

The system may further comprise a third data store to store the first reference and the second reference.

Optional features described of any aspect of method, computer readable medium, software or computer system, where appropriate, similarly apply to the other aspects also described here.

BRIEF DESCRIPTION OF DRAWINGS

An example will now be described with reference to.

DESCRIPTION OF EMBODIMENTS

Figure 1:
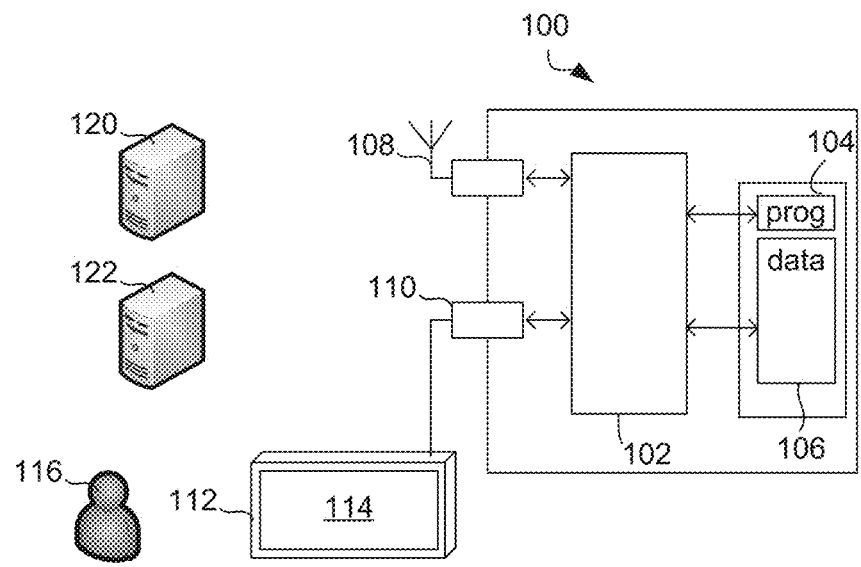
FIG. 1 illustrates a computer system for sharing confidential data between a first data provider and a second data provider.

FIG. 1 illustrates a computer system 100 for storing first encrypted data and second encrypted data. The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program stored on program memory 104 causes the processor 102 to perform the method in FIG. 2, that is, processor 102 determines a correspondence between data records and creates references to the corresponding data records.

Processor 102 may receive data, such as encrypted data, from data memory 106 as well as from the communications port 108 and the user port 110, which is connected to a display 112 that shows a visual representation 114 of the data to a user 116. In one example, the processor 102 receives data from first data provider 120 and second data provider 122, also referred to as publishers, via communications port 108, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 102 receives and processes the data in real time. This means that the processor 102 performs the applicable methods described herein every time data is received from the publisher 120 and completes this calculation before the publisher 120 sends the next data update.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines sanitised and stores the sanitised data in data memory 106, such as RAM or a processor register. The processor 102 then requests the data from the data memory 106, such as by providing a read signal together with a memory address. The data memory 106 provides the data as a voltage signal on a physical bit line and the processor 102 receives the data via a memory interface.

It is to be understood that throughout this disclosure unless stated otherwise, nodes, edges, graphs, solutions, variables and the like refer to data structures, which are physically stored on data memory 106 or processed by processor 102. Further, for the sake of brevity when reference is made to particular variable names, such as "name" or "postcode" this is to be understood to refer to values of variables stored as physical data in computer system 100.

Figure 2:
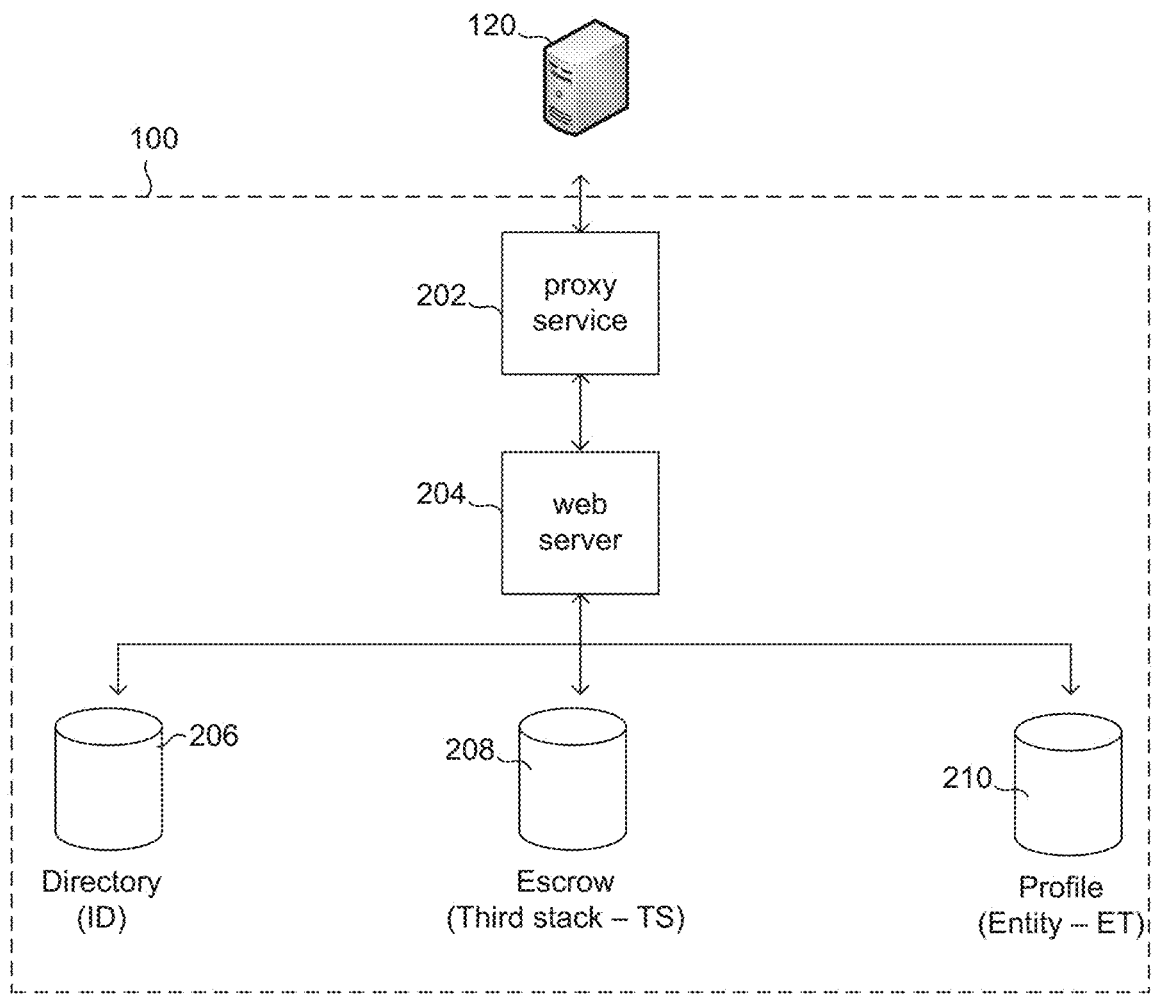
FIG. 2 illustrates the internal structure of the computer system of FIG. 1 in more detail.

FIG. 2 illustrates the internal structure of computer system 100 in more detail. It is noted, however, that the elements described in FIG. 2 may be implemented as separate instances on separate devices, such as, databases and associated processing instances on separate cloud computing platforms.

Computer system 100 hosts a proxy service 202 (such as squid), a web server 204 (such as Apache), a directory database 206 (such as SQL), a data escrow database 208 (such as SQL) and a profile database 210 (such as SQL). Data publisher 120 can connect to the proxy service 202 using appropriate credentials including username and password, which increases the security of the data stored by computer system 100. Through the proxy server 202, data publisher 120 can access the web server 204, which generates graphical user interfaces in the form of websites, such as dynamic HTML websites as will be described with reference to the following drawings.

In turn, the web server receives commands from data publisher 120 related to functions of the data storage system. These functions access, that is, read and edit the databases of the directory 206, data escrow 208 and profile 210, respectively.

Figure 3:
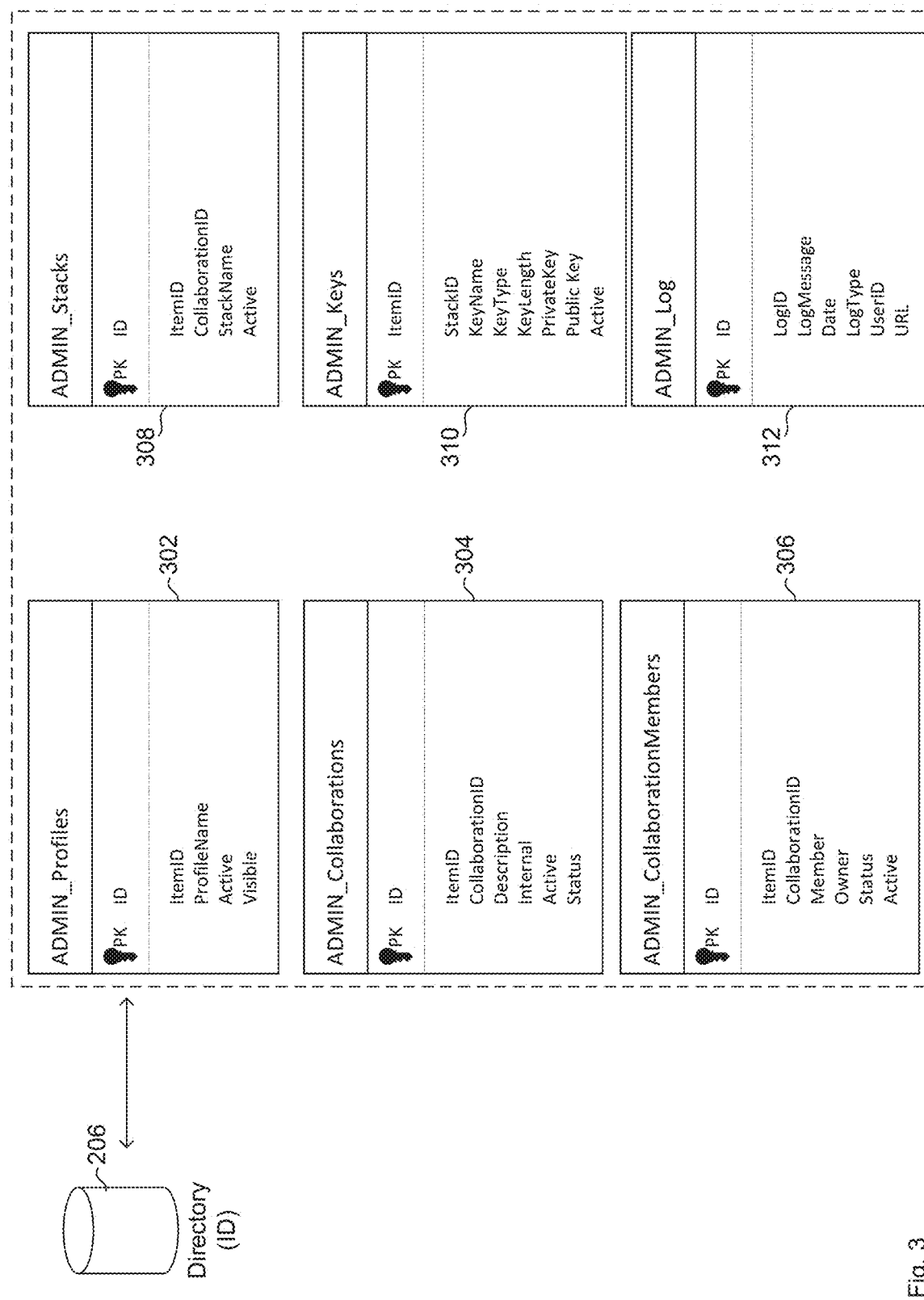
FIG. 3 illustrates the structure of a directory database.

FIG. 3 illustrates the structure of the directory database 206, which includes a profiles table 302, a collaborations table 304, a collaborations members table 304, a stacks table 308, a keys table 310 and a log table 312. The primary key of each table is indicated as "PK". While a number of tables is described and presented herein, it is to be understood that other tables that are not described in detail may also be stored and used.

The profiles table 302 comprises the following fields:
ItemID
ProfileName
Active
Visible The collaborations table 306 comprises the following fields:
ItemID
CollaborationID
Description
Internal
Active
Status The collaborations members table 306 comprises the following fields:
ItemID
CollaborationID
Member
Owner
Status
Active The stacks table 308 comprises the following fields:
ItemID
CollaborationID
StackName
Active The keys table 310 comprises the following fields:
Stack ID
KeyName
KeyType
KeyLength
PrivateKey
Public Key
Active The log table 312 comprises the following fields:
LogID
LogMessage
Date
LogType
UserID
URL Processor 102 enters data into these tables when a new collaboration of publishers is started as will be described with reference to the user interfaces further below. For each collaboration between publishers, processor 102 creates one entry in the collaborations table 304 and corresponding entries in the other tables accordingly.

Figure 4:
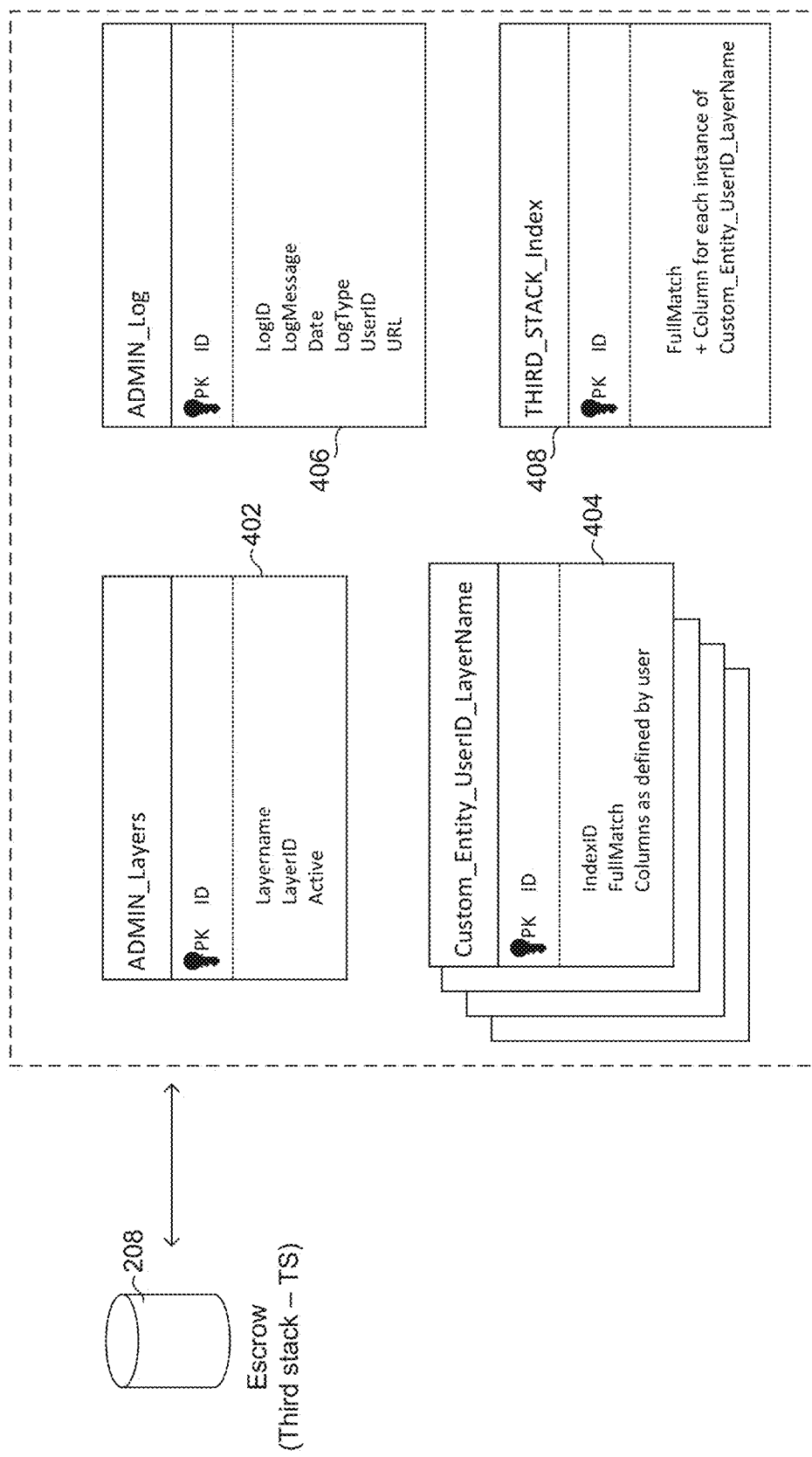
FIG. 4 illustrates a data escrow database.

FIG. 4 illustrates the data escrow database 208 in more detail. The escrow database 208 holds the actual data that is shared between the publishers and comprises a layers table 402, a entity userID layer name table 404, a log table 406 and a third stack index table 408. When reference is made herein to a third stack, it is to be understood that a first stack, that is, a first data set, is stored at the storage system of the first publisher, a second stack of data is stored on the storage system of the second publisher and the third stack is stored on an independent data escrow service hosted on computer system 100.

The layers table 402 comprises the following fields:
Layername
LayerID
Active

The entity userID layer name table 404 comprises the following fields:
IndexID
FullMatch
Columns as defined by user The log table 406 comprises the following fields:
LogID
LogMessage
Date
LogType
UserID
URL The third stack index table 408 comprises the following fields:
FullMatch
+Column for each table As the publishers add data to the third stack, processor 102 stores that data into the escrow database 208.

Figure 5:
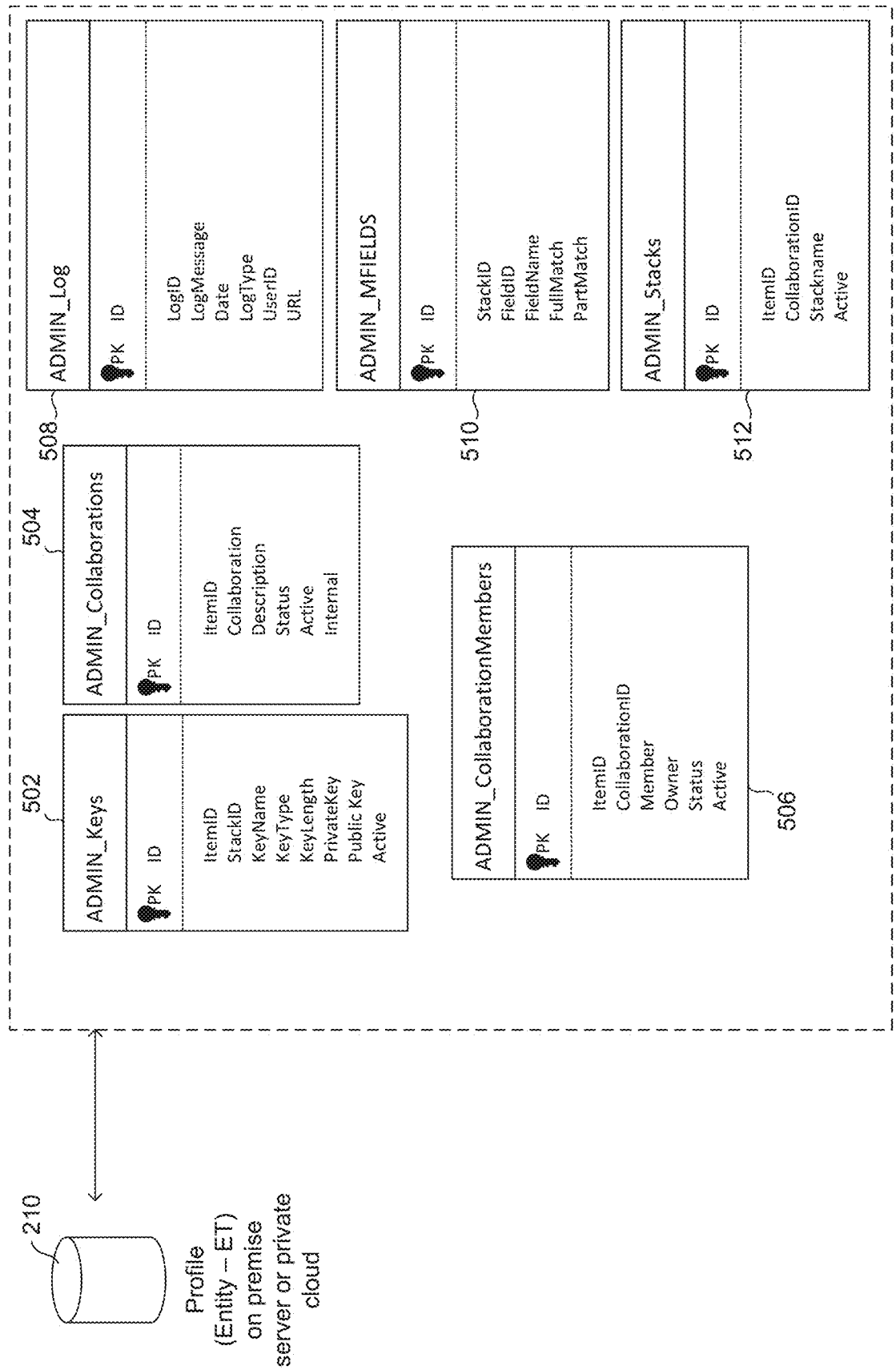
FIG. 5 illustrates profile database.

FIG. 5 illustrates profile database 210. Profile database 210 comprises a keys table 502, a collaborations table 504, a collaboration members table 506, a log table 508, a mfields table 510 and a stacks table 512.

Figure 6:
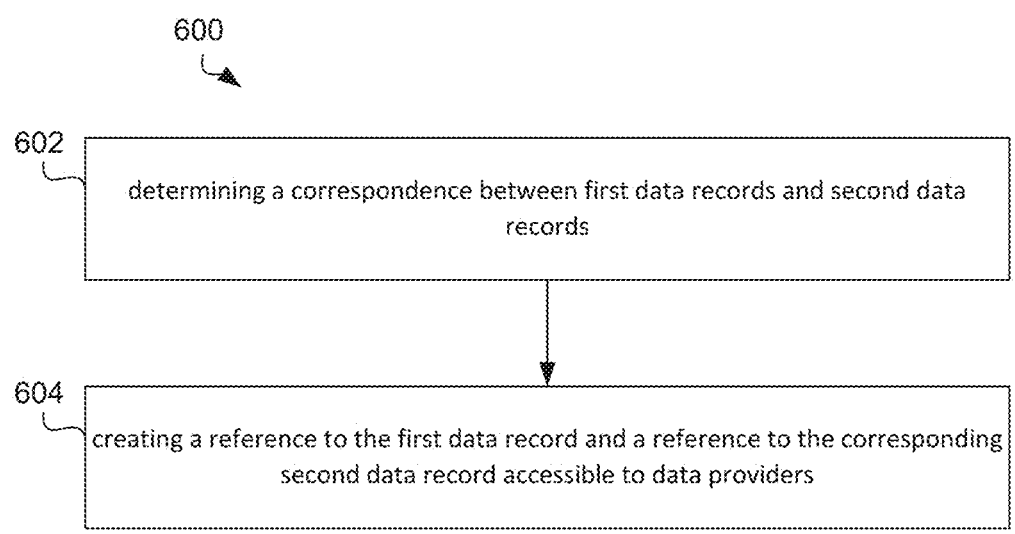
FIG. 6 illustrates a method for sharing confidential data.

Keys Table 502 comprises the following fields:
ItemID
StackID
KeyName
KeyType
KeyLength
PrivateKey
Public Key
Active Collaborations Table 504 comprises the following fields:
ItemID
Collaboration
Description
Status
Active
Internal Collaboration Members Table 506 comprises the following fields:
ItemID
CollaborationID
Member
Owner
Status
Active
Log Table 508 comprises the following fields:
LogID
LogMessage
Date
LogType
UserID
URL
MFields Table 510 comprises the following fields:
StackID
Field ID
FieldName
FullMatch
PartMatch
Stacks Table 512 comprises the following fields:
ItemID
CollaborationID
Stackname
Active FIG. 6 illustrates a method 600 as performed by processor 102 for sharing confidential data between first data provider 120 and second data provider 122. FIG. 6 is to be understood as a blueprint for a data management software program and may be implemented step-by-step, such that each step in FIG. 6 is represented by a class or function in a programming language, such as C++ or Java. The resulting source code is then compiled and stored as computer executable instructions on program memory 104.

As a pre-cursor processor 102 receives multiple first data records from the first data provider 120 and multiple second data records from second data provider 122. Further below, a description is provided of more detail in relation to the encryption performed by processor 102 in order to receive the data records. In one example, each of the first and second data records relate to a customer and contain the customer's year of birth and postcode. Processor 102 stores the data records in multiple instances of Custom_Entity_UserID_LayerName 404 as shown in FIG. 4 in the form of a stack of multiple tables. Each instance of Custom_Entity_UserID_LayerName 404 corresponds to one column in THIRD_STACK_Index 408.

Figure 7:
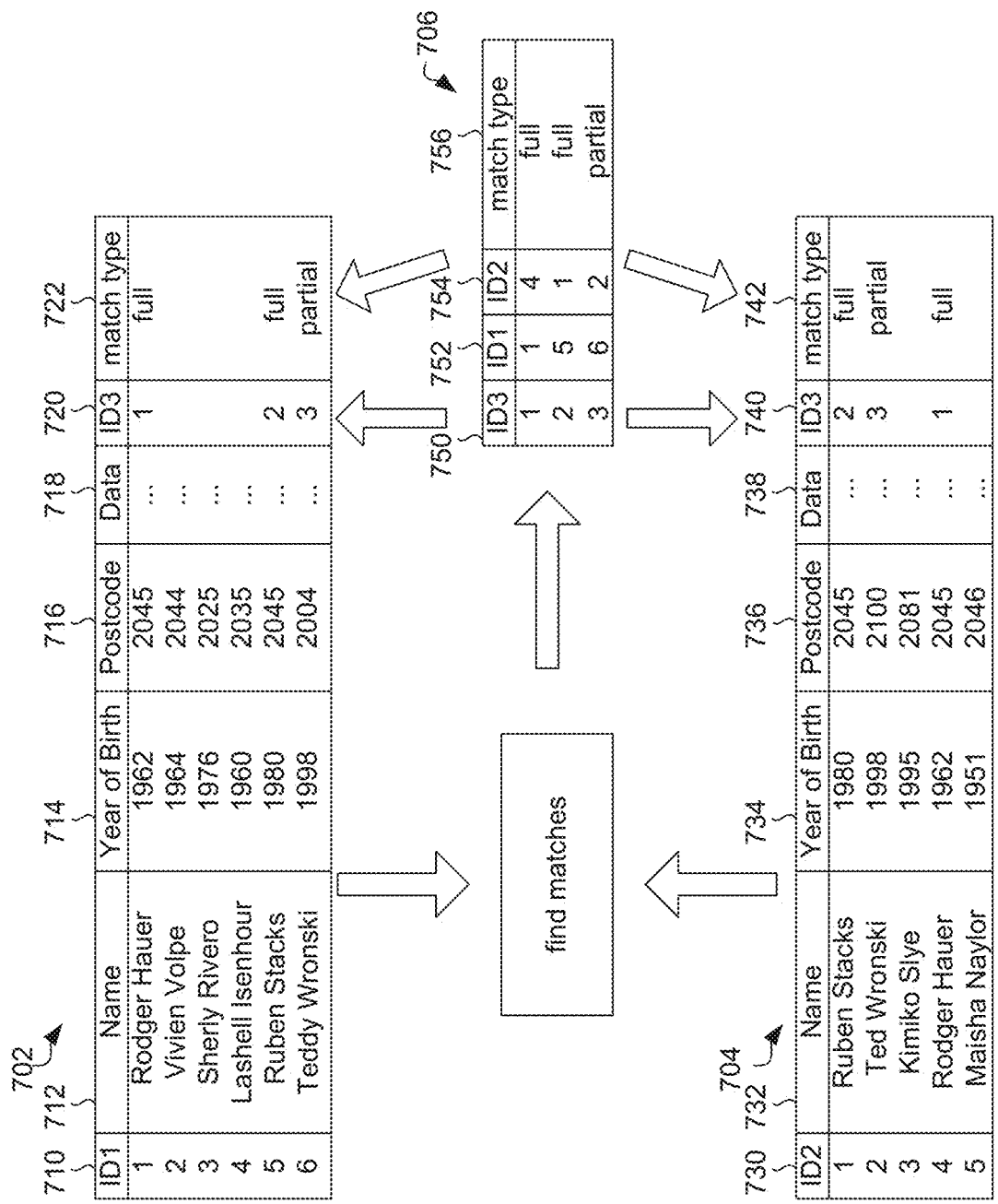
FIG. 7 illustrates example shared data.

FIG. 7 illustrates the data stored on data store 106 comprising multiple first data records 702, multiple second data records 704 and index table 706 as an instance of THIRD_STACK_Index 408 in FIG. 4. First data records 702 are stored on data store 210 being accessible by the first data provider 120 and protected from the second data provider 122. First data records 702 comprise a first identifier ID1 710, a name field 712, a year of birth field 714, a postcode field 716, a data field 718 holding further data, an ID3 reference field 720 and a match type field 722.

Similarly, second data records 704 are stored on a data store 210 being accessible by the second data provider 122 and protected from the first data provider 120. Second data records 704 comprise a second identifier ID2 730, a name field 732, a year of birth field 734, a postcode field 736, a data field 738 holding further data, an ID3 reference field 740 and a match type field 742.

In one example, being 'protected' or 'accessible' means that the data is encrypted by a symmetric key that is only available to processor 102 and processor 102 checks whether sufficient credentials are provided by the first or second data providers to access the corresponding data. For example, processor 102 decrypts the first data records 702 if the processor 102 receives a corresponding request including credentials from first data provider 120 and sends the decrypted data records to first data provider 120. If the second data provider 122 request the first data records 702, processor 102 sends an access denied message instead of the requested data record. This way, the first data record 702 is protected from the second data provider 704.

While first data records 702 and second data records 704 are stored on the same data store 210 hosted on data memory 106, they may equally be stored on different separate data stores. More particularly, first data records 702 and second data records 704 may be stored on different tables of an SQL database, on different SQL databases, on different physical storage devices, such as storage servers or as different graphs or documents in non-SQL databases, such as OrientDB, for example. While the separation of data into different tables provides increased security, this extra security may not be required in some examples and therefore, the separation is not required and first data records 702 and second data records 704 may also be stored on the same table and distinguished by a data record identifier.

Referring back to FIG. 6, method 600 commences by processor 102 determining a correspondence between one of the first data records 702 and one of the second data records 704 to thereby create references in index table 706, which comprises data fields for a third ID 750, a first ID 752, second ID 754 and a match type 756.

In this example, the data records 702 and 704 relate to customers of two separate entities, such as a supermarket chain and a bank, where the supermarket chain is the first data provider 120 and the bank is the second data provider 122. The aim is to allow the supermarket chain 120 and the bank 122 to data-mine customers that are common to both businesses without revealing any individually identifiable information about the customers to each other.

As a setup step, which is described further below, the supermarket chain 120 and bank 122 agree on data fields that are used to match the customers. In this example, two entries are considered to relate to the same individual if they share the same name, year of birth and postcode. This is also referred to as a full match. The following process may also provide for some variation in some fields. For example, the first name of each person may vary due to shortened forms or nicknames. Therefore, a partial match is defined where all data fields except the first name are identical.

Once the data records 702 and 704 are stored on data store 210, processor 102 analyses the data records 702 to find common pairs. For example, processor 102 iterates over each record of first data records 702 and runs on each record SQL query SELECT ID2 FROM second_data_records WHERE name=iName, year_of_birth=iyear_of_birth, postcode=iPostcode. The prefix 'i' indicates the value of the data record in 702 of the current iteration starting with iName="Rodger Hauer", iYear_of_birth=1962 and iPostcode=2045.

If the query returns a result, which is the case for the first record in 702, processor 102 creates a new record in index table 706 comprising the ID from field ID1 710 of first data records 702, which is recorded in ID1 field 752 of index table 706 and the ID from field ID2 730 of second data records 704, which is recorded in ID2 field 754 in index table 706. The fields ID1 752 and ID2 754 may be referred to 'foreign keys' and therefore, values in these fields can be used as references to the corresponding records in 702 and 704, respectively. In other words, creating these values in effect creates a first reference to the one of the multiple first data records 702 and a second reference to the one of the multiple second data records 704.

Index table 706 is readable by both data providers 120 and 122. In particular, the first reference is accessible by the second data provider and the second reference is accessible by the first data provider. This means that while the data itself is not accessible, such as by encryption or access settings, the information about matching records is accessible to allow data-mining both records while preserving the confidentiality of the data.

In the example of ID1=1 and ID2=4 all selected fields match exactly. Therefore, processor 102 further creates a match type value 'full' in match type field 756.

Processor 102 may also store the information about matching records in the databases 702 and 704 directly. This means processor 102 stores ID3, which may be the primary auto-increment key of index table 706, in ID3 field 720 of first data records 702. Processor 102 may also store the match type in match type field 722 of first data records 702. Since the ID3 field 720 of first data records 702 is a reference to a record of the index table 706 and that record of the index table 706 provides a reference to the matching record of the second data records 704, it can be said that processor 102 stores a reference to the matching record of the second data records 704 associated with the matching record of the first data records 702.

Similarly, a customer named Ruben Stacks has a record in first data records 702 (ID1=5) and in second data records 704 (ID2=1), which results in a new entry (ID3=2) in index table 706 with corresponding references and match type 'full'. Processor 102 also stores references to the index table into first data records 702 and second data records 704.

Mr Wronski, however, has provided his nickname Teddy to first data provided 120 and his real name Ted to the second data provider. As a result, the corresponding entries in first data records 702 (ID1=6) and second data records 704 (ID2=2) do not match exactly. However, first data provider 120 and second data provider 122 have agreed that a difference in first name should be considered a partial match. Therefore, processor 102 creates references in index table 706, first data records 702 and second data records 704 as above but enters 'partial' as the match type.

The first data provider 120, for example, can now determine how many common customers live in postcode 2045. First data provider 120 runs a query on first data records 702 SELECT COUNT(ID3) FROM first_data_records WHERE postcode=2045. Processor 102 may limit the search to full matches by adding "AND match_type='full'". In one example, the query is requested by first data provider 120 and performed by processor 102. The result is then returned to first data provider 120 only if the result is more than threshold, such as 20, in order to protect the privacy of individual records.

Figure 8:
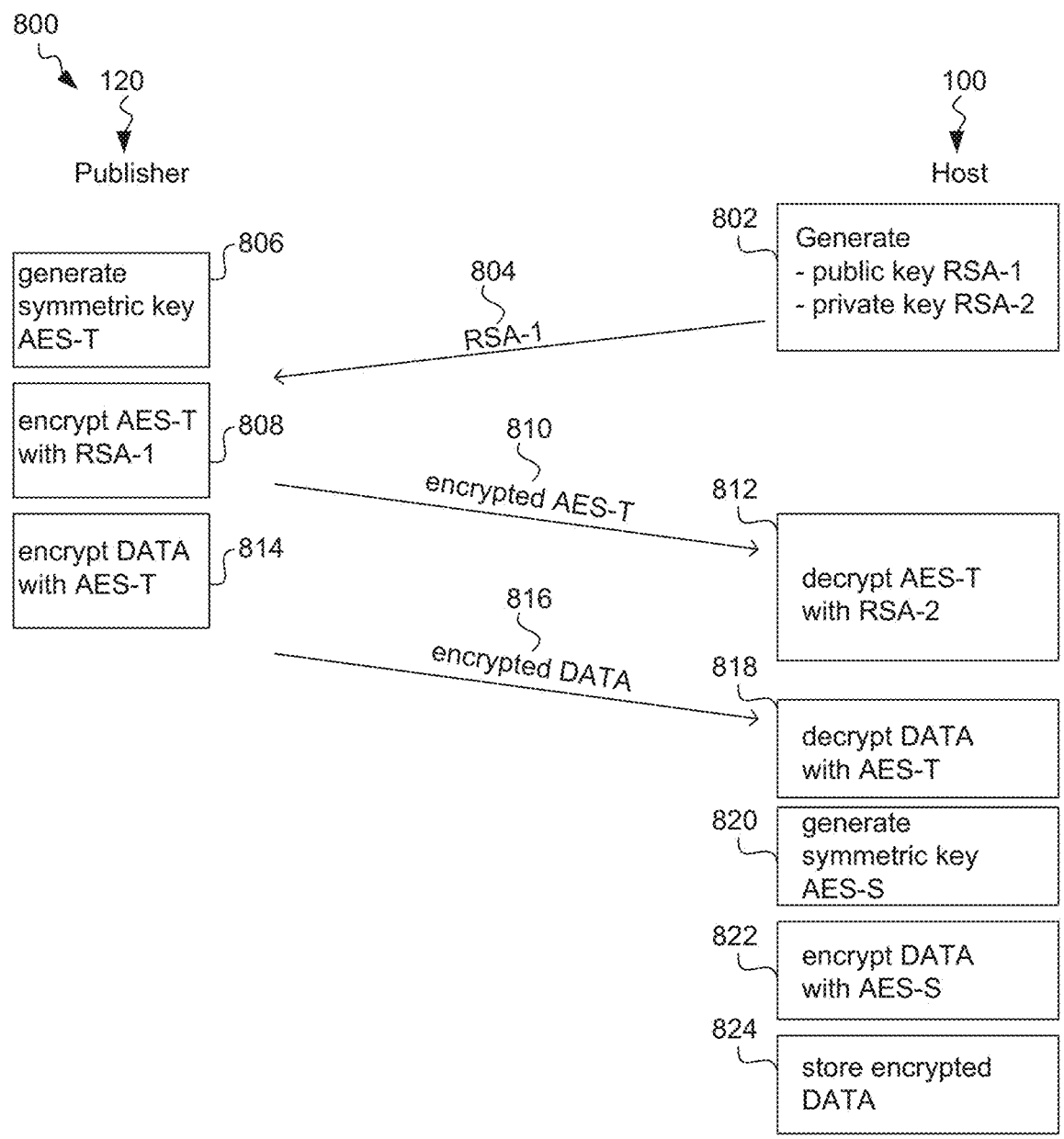
FIG. 8 is a swim lane diagram for transferring data records.

FIG. 8 is a swim lane diagram 800 to illustrate the process performed between the first publisher computer system 120 (simply referred to as 'publisher') and processor 102 of the host, that is the computer system 100 in FIG. 1 to transfer the first data records 702.

The host commences by generating 802 a asymmetric key pair, such as an RSA key pair, comprising a private key and a public key and sending 804 the public key to publisher 120. The public key is labelled 'RSA-1' while the private key is labelled 'RSA-2'. Before, during or after steps 802 and 804 publisher 120 generates 806 an symmetric key, such as an AES key, which is labelled 'AES-T' where the 'T' stands for 'transmission'.

Publisher 120 receives the public RSA-1 key from host 100, encrypts 808 the AES-T key using the RSA-1 public key and sends 810 the encrypted AES-T key to host 100. Host 100 decrypts 812 the received data using the private RSA-2 key to obtain the AES-T key.

Publisher 120 the encrypts 814 the data records 702 and sends 816 the encrypted data records to host 100. Host 100, in turn, receives the encrypted data records and uses the AES-T key to decrypt the received data to obtain the first data records 702.

At this point or earlier in the process, host 100 generates 820 another symmetric key, such as an AES key, that is labelled 'AES-S' where 'S' stands for 'storage'. Host 100 then encrypts 822 the data records 702 using the AES-S key and stores the encrypted data records in database 210. Processor 102 may perform the generation of the index table 706 as described above based on the decrypted data or the encrypted data. Since the encryption process is deterministic a postcode, for example, that occurs twice results in the same encrypted value, which means that two postcodes that match in clear text also match when they are encrypted. As a result, it is irrelevant whether processor 102 finds matches on the clear text or the encrypted data. One advantage of using the encrypted data is that if another table needs to be integrated with an additional column in index table 706, the existing data tables do not need to be decrypted to find matches but can remain in their encrypted form.

Figure 9:
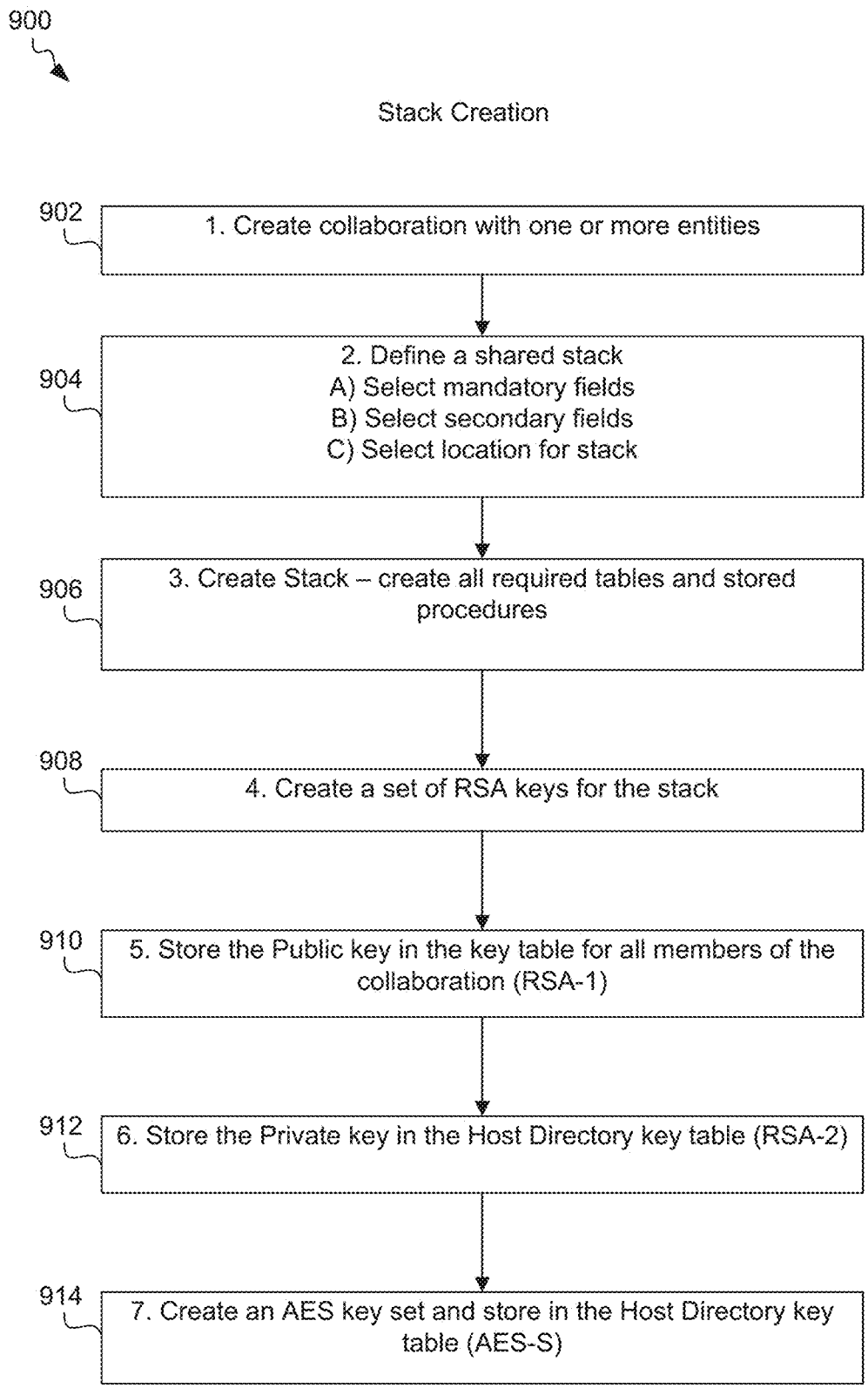
FIG. 9 illustrates a method for stack creation.

FIG. 9 illustrates a method 900 with the steps performed by processor 102 in more detail including creating 902 a collaboration with one or more entities, such as data publishers, and defining 904 a shared stack by selecting mandatory fields, secondary fields and location for stack. Mandatory fields are those fields that are required to match for a full match. In other words, if two records do not match in a mandatory field, processor 102 creates no match entry. Secondary fields are those fields that may have variation to qualify for a partial match. In other words, if two records match for all mandatory fields but do not match for secondary fields, processor 102 creates a partial match entry. If the records also match for the secondary fields, processor 102 creates a full match entry.

Processor 102 then creates 906 the stack by creating all tables and stored procedures and creates 908 a set of RSA keys as described above. Processor 102 stores 910 the public key in the key table accessible to all members of the collaboration and stores 912 the private key in the host directory key table that is only accessible to processor 102 and not the data publishers. Finally, processor 102 creates 914 the AES key and stores the key in the host directory key table as the key that is used to store the data, that is, the AES-S key.

Figure 10:
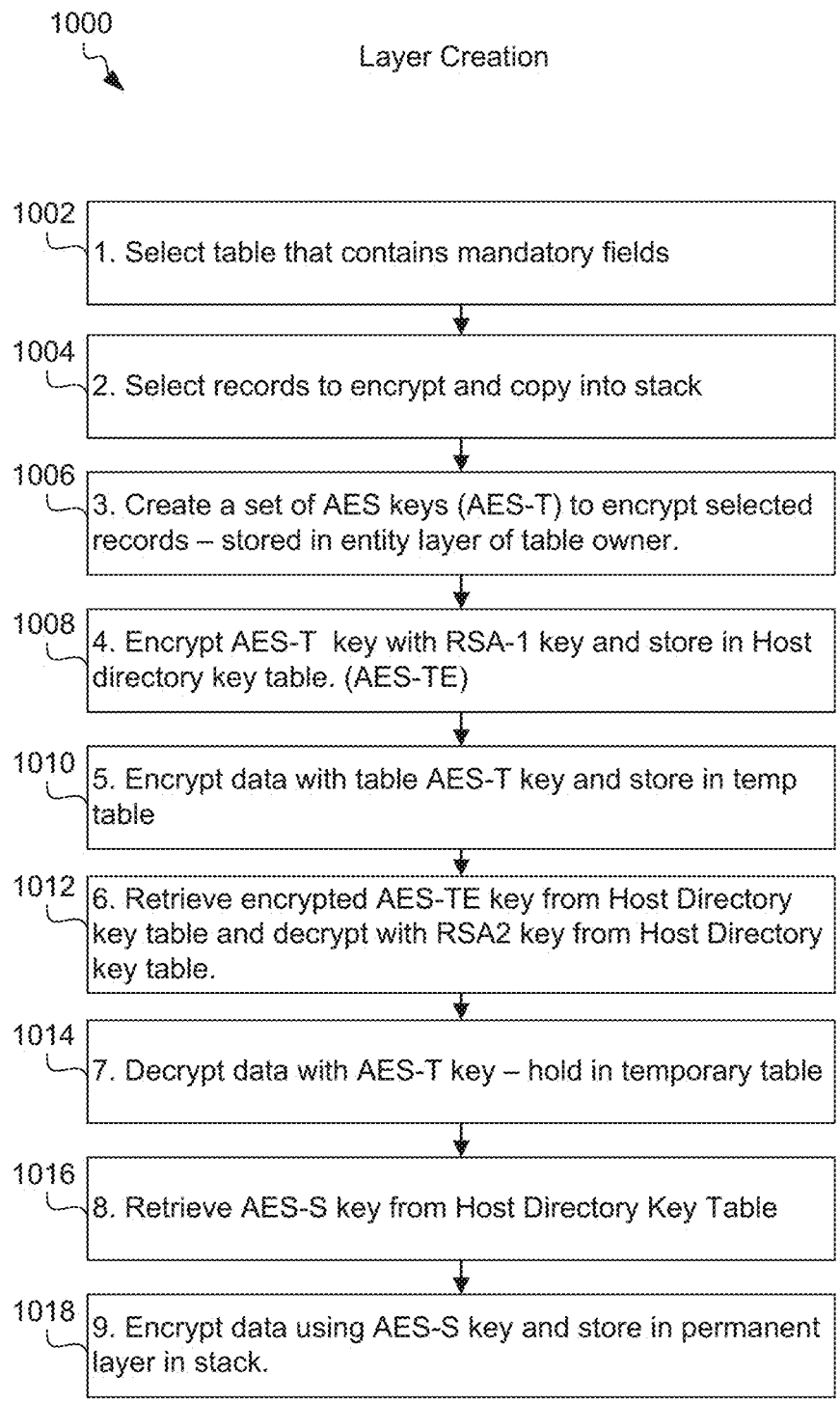
FIG. 10 illustrates a method for layer creation.

FIG. 10 illustrates a method 1000 for layer creation as performed by first publisher 120. While the method is explained with reference to the first publisher 120 it is to be understood that the second publisher 122 performs similar steps to generate its respective data layer.

In the first step data publisher 120 selects 1002 a table, such as table 702, that contains the mandatory fields. Publisher 120 then selects 1004 records stored at publisher 120 that are to be encrypted and copied into the stack created my method 900 in FIG. 9. Publisher 120 then creates 1006 a set of AES keys to encrypt the selected records. These keys are referred to AES-T keys above. The keys are stored in the entity layer of the table owner. Publisher 120 encrypts 1008 this key with the RSA-1 key and stores the encrypted data in Host directory key table 310 In FIG. 3.

Publisher 120 then encrypts 1010 the data with table AES-T key and stores the encrypted data in a temporary table.

Processor 102 retrieves 1012 encrypted AES-TE key from Host Directory key table and decrypts the key with RSA2 key from Host Directory key table. Processor 102 can then decrypt 1014 the data into a temporary table, retrieve 1016 the AES-S key from Host Directory Key Table 310 and finally encrypt 1018 the data using the AES-S key and store the encrypted data in the permanent layer in the stack 404.

Figure 11:
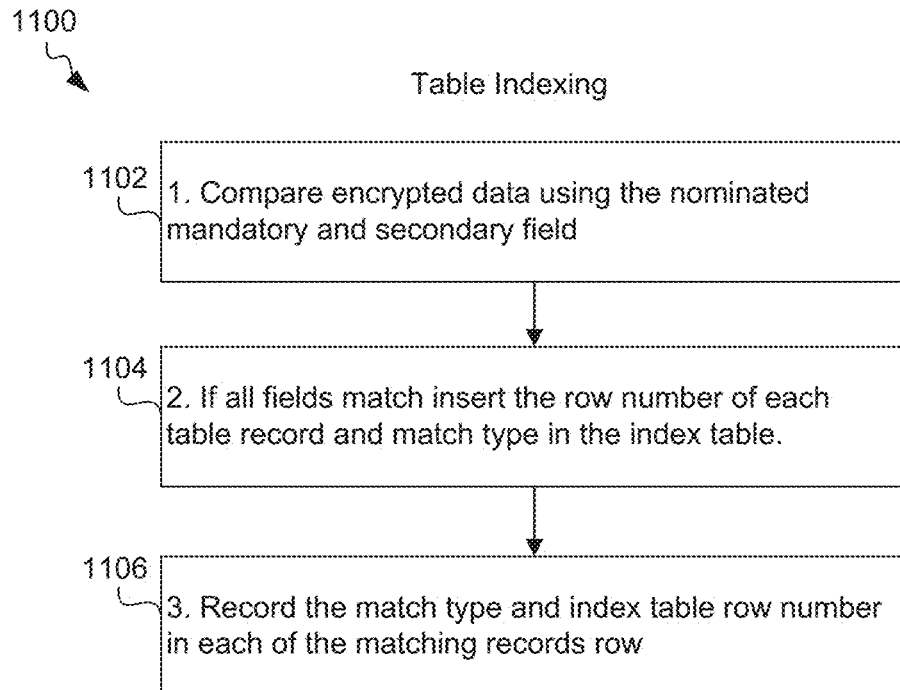
FIG. 11 illustrates a method for table indexing.

FIG. 11 illustrates a method 1100 for table indexing as performed by processor 102. Processor 102 compares 1102 the encrypted data using the nominated mandatory and secondary fields as described above. If all fields match, processor 102 inserts 1104 the row number of each table record and match type in the index table 706 and records 1106 the match type and index table row number in each of the matching records row as shown FIG. 7 in rows 720 and 722 of row ID1=1.

Figure 12:
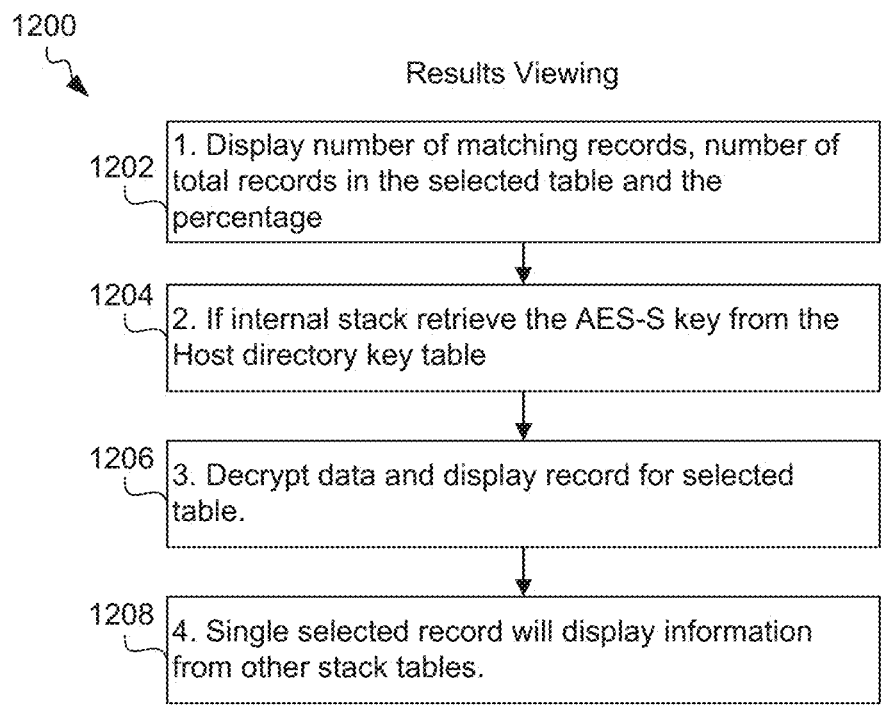
FIG. 12 illustrates a method for results viewing.

FIG. 12 illustrates a method 1200 for results viewing as performed by processor 102 after receiving a search query from a user, such as "www.host.com/query?postcode=2045". Processor 102 performs the query on first data records 702 and displays 1202 the number of matching records, that is, the number of records that have a 'full' or 'partial' match in the match type column 722 or a number in the ID3 column 720. Processor 102 may also display the total number of first records 702 and the percentage of the results.

If the stack is an internal stack, processor 102 retrieves 1204 the AES-S key from eth Host directory key table 310, decrypts 1206 the data and display the record for the selected table. For a single selected record, processor 102 may also display 1208 information from the other stack tables, that is, data in data column 738 of second data records 704.

Figure 13:
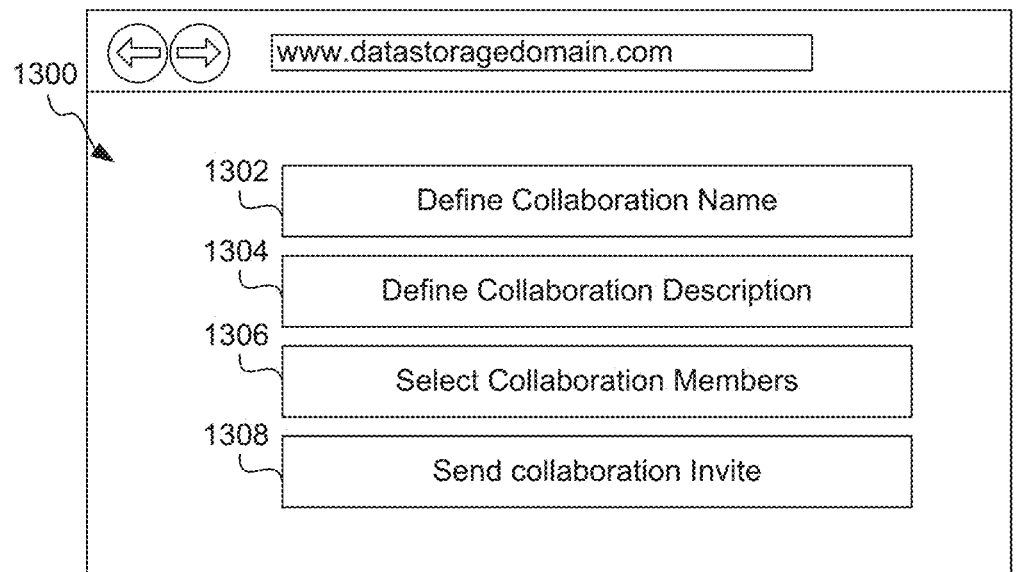
FIG. 13 illustrates a graphical user interface for defining a collaboration.

FIG. 13 illustrates a graphical user interface 1300 for defining a collaboration. Graphical user interface 1300 may be generated by processor 102 by writing HTML code and/or providing the HTML code to a client computer system, such as publisher 120. User interface 1300 comprises a first input field 1302 for providing a collaboration name, a second input field 1304 for providing a collaboration description, and a third input field for selecting collaboration members 1306. The third input field 1306 may be a drop-down menu with registered members. User interface 1300 further comprises a send button 1308 to finalise the definition stage and send collaboration invites. Processor 102 detects user interaction with respect to the user interface 1300 and receives the input data through user interface 1300 over an Internet connection using GET, POST or AJAX procedures, for example.

Figure 14:
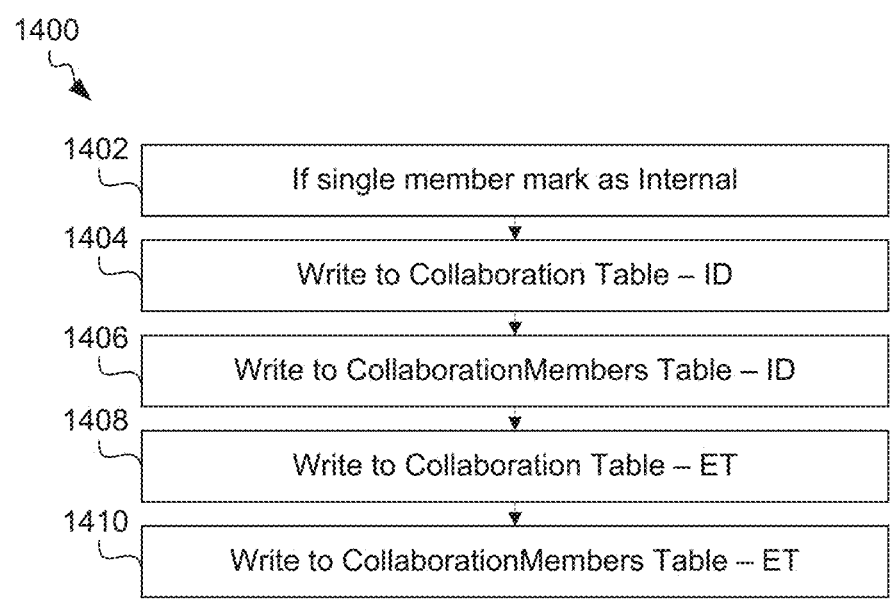
FIG. 14 illustrates a method for defining a collaboration.

Processor 102 then performs method 1400 illustrated in FIG. 14. First, processor 102 determines 1402 whether only a single collaboration member is selected in field 1306 and if this is the case, processor 102 marks the collaboration as internal.

Then, processor 102 generates 1404 a collaboration ID, such as by auto-increment, and writes the ID to collaboration table 304. Associated with the same ID, processor 102 also writes 1406 the selected members into collaboration members table 306 in the directory 206. In steps 1408 and 1410 processor 102 repeats steps 1404 and 1406, respectively to write to the collaborations table 504 and collaboration members table 506 in the profile 210.

Figure 15:
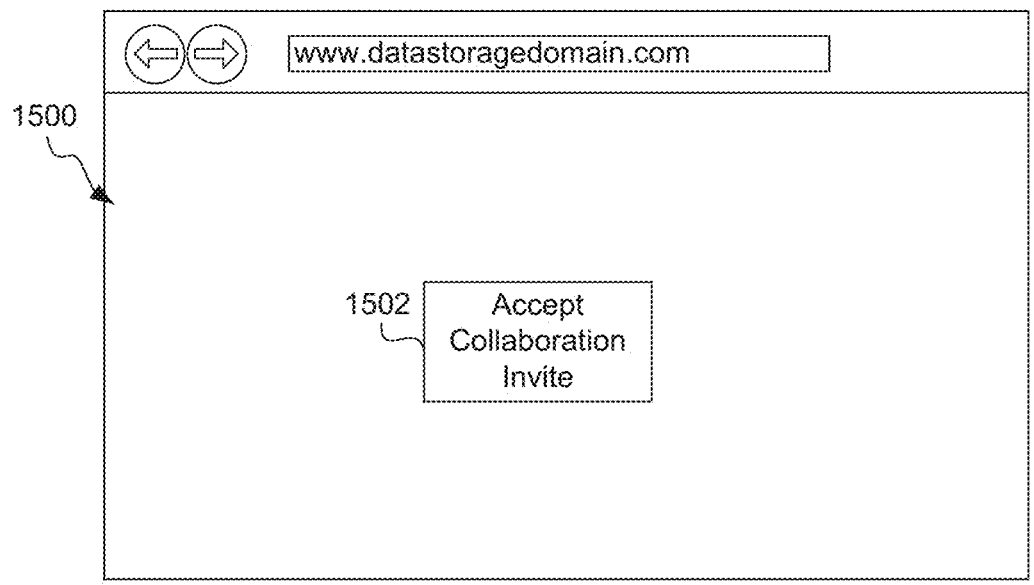
FIG. 15 illustrates a method for accepting a collaboration invite.
Figure 16:
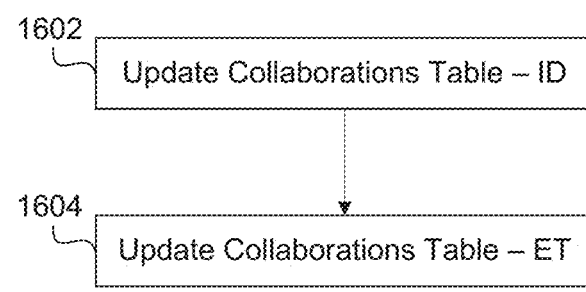
FIG. 16 illustrates a method for updating a collaboration.

Sending the collaboration invites may comprise generating a user interface for the invited members as shown in FIG. 15. User interface 1500 comprises a user control element 1502. Processor 102 detects user interaction with the control element 1502, such as a click, and then performs method 1600 shown in FIG. 16, that is, processor updates 1602 the collaboration table 304 in directory 206 and updates 1604 collaborations table 504 in profile 210.

Figure 17:
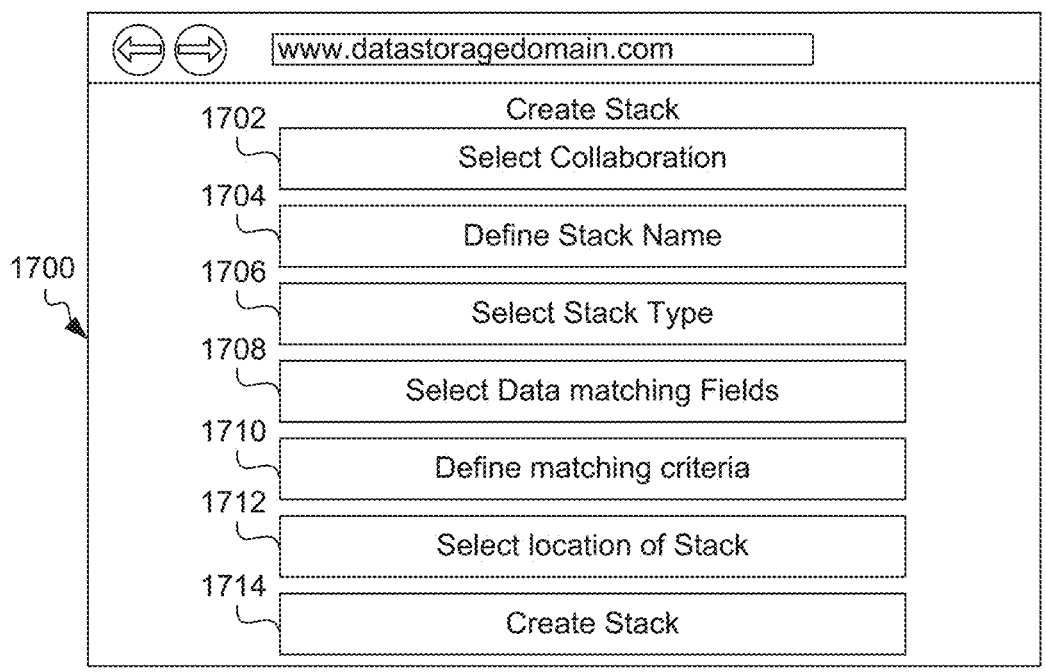
FIG. 17 illustrates a graphical user interface for creating a stack.

FIG. 17 illustrates a graphical user interface 1700 for creating a stack. User interface 1700 comprises a first input field 1702 for selecting a collaboration, a second input field 1704 for defining a stack name, and a third input field 1706 for selecting a stack type, a fourth input field 1708 for selecting data matching fields, a fifth input field 1710 for defining matching criteria, a sixth input field 1712 for selecting location of stack and a button 1714 for creating the stack.

Processor 102 detects user interaction with respect to the user interface 1700 and receives the input data through user interface 1700 over an Internet connection using GET, POST or AJAX procedures, for example.

Figure 18:
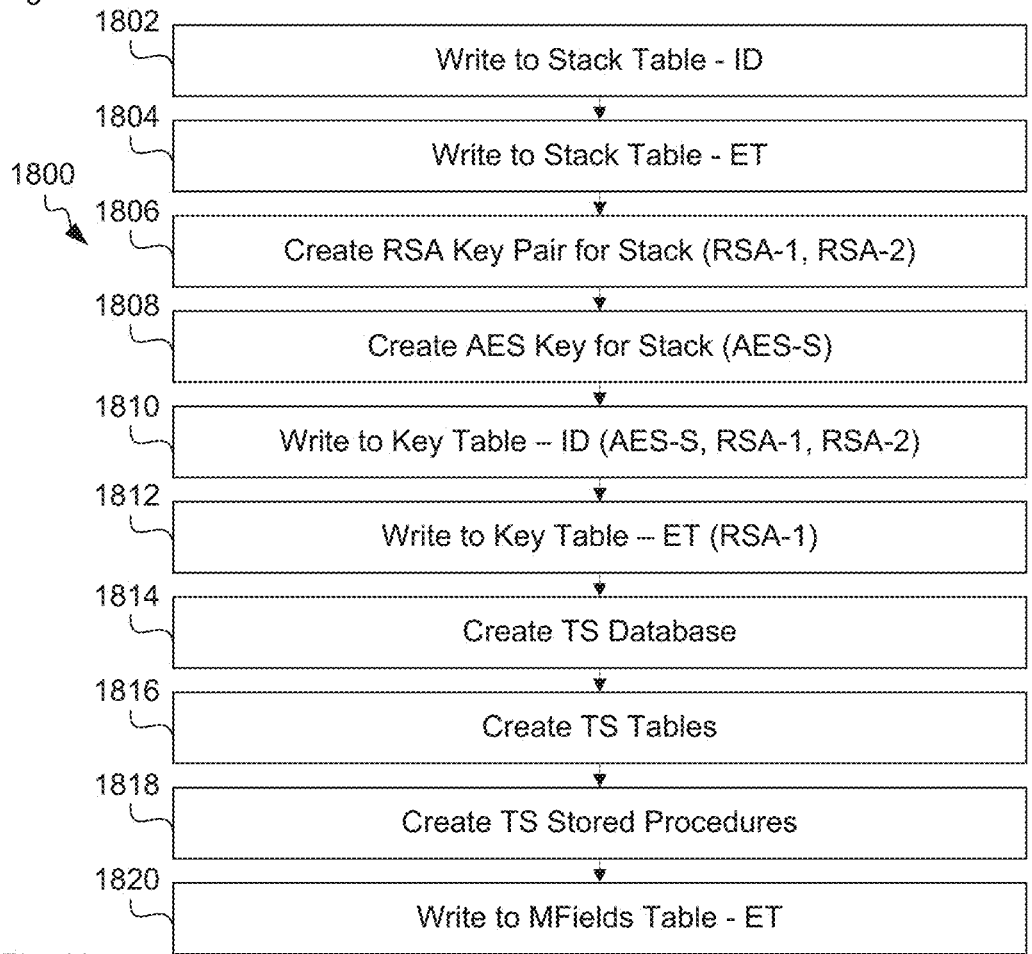
FIG. 18 illustrates a method for creating a stack.

Processor 102 then performs method 1800 illustrated in FIG. 18. First, processor 102 writes 1802 to stack table 308 in directory 206 and writes 1804 to stack table 512 in profile 210. Processor 102 then creates 1806 an RSA key pair for this stack. The key pair comprises the RSA-1 and RSA-2 keys. Processor 102 further creates 1808 the AES key for the stack and accordingly writes 1810 to key table 310 in directory 206 and writes 1812 to key table 502 in profile 210. Processor then creates 1814 the escrow database 208 and creates 1816 the tables/layers in escrow database 208. Further, processor 102 creates 1818 stored procedures in escrow database 208 and finally writes 1820 to mfields table 510 in profile 210.

Figure 19:
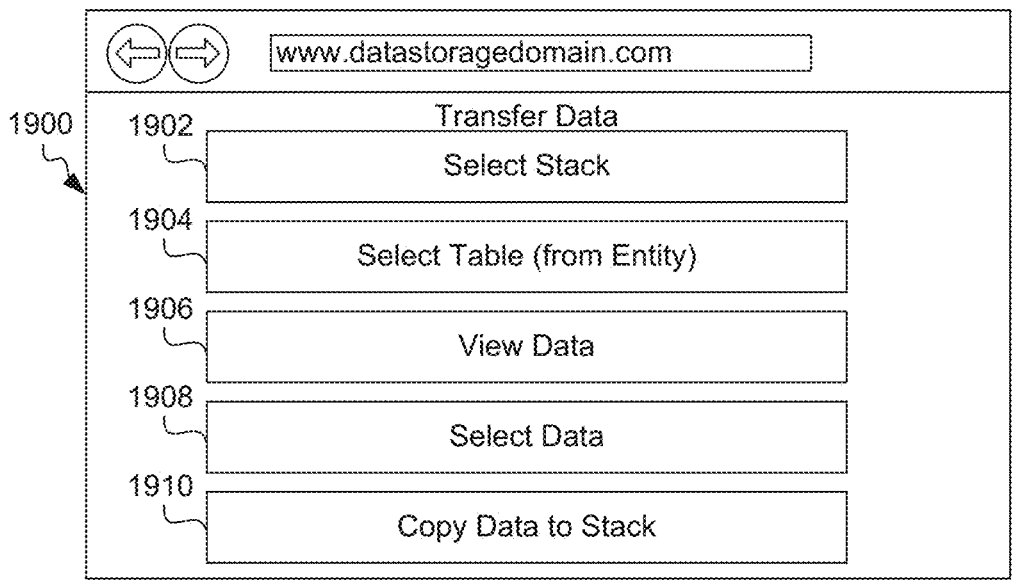
FIG. 19 illustrates a graphical user interface for transferring data.

FIG. 19 illustrates a graphical user interface 1900 for transferring data. The user interface 1900 comprises a first input field 1902 for selecting a stack, a second input field 1904 for selecting a table from profile 210 and user controls for viewing data 1906, selecting data 1908 and copying data to the stack 1910.

Figure 20:
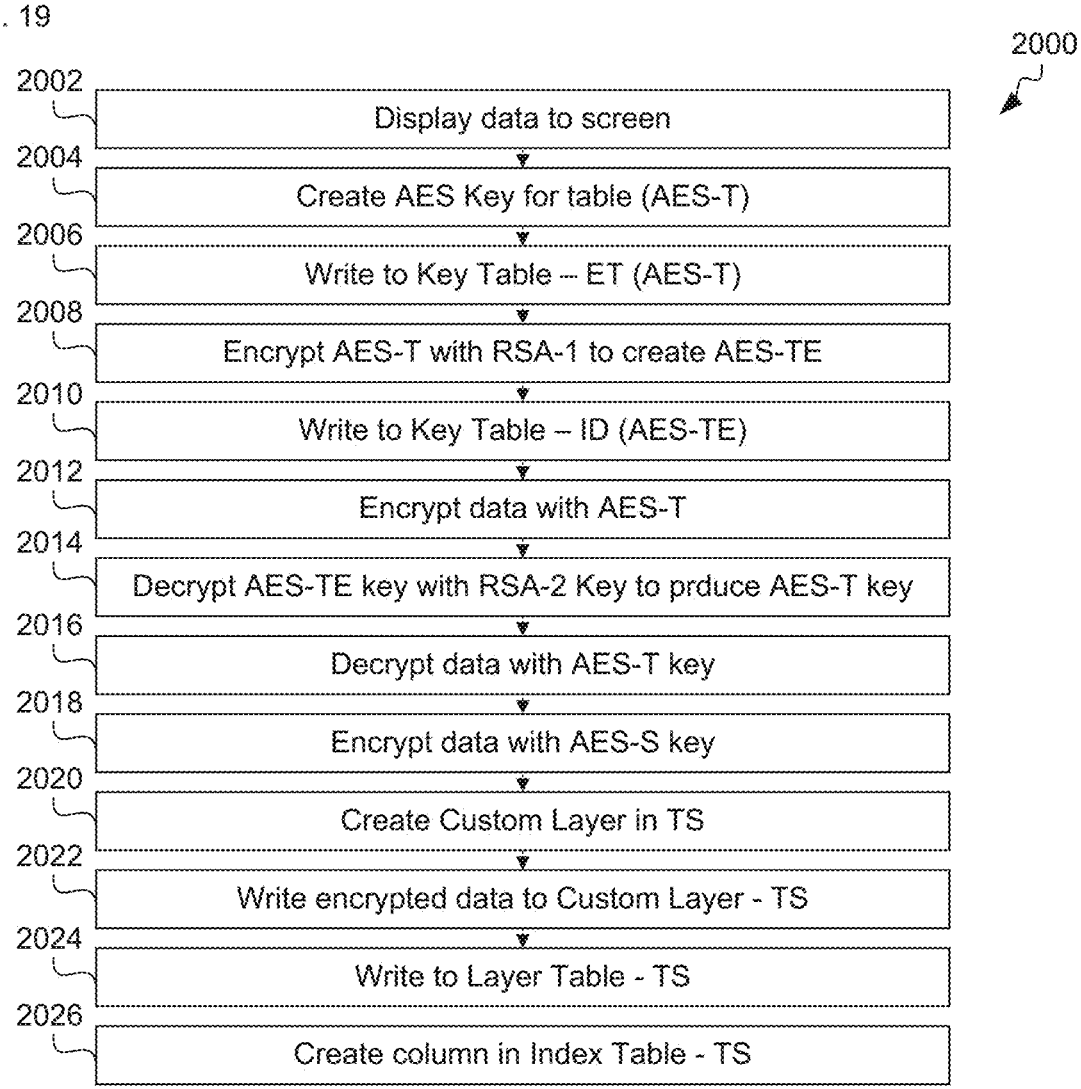
FIG. 20 illustrates a method for transferring data.

Processor 102 detects user interaction with respect to the user interface 1900 and receives the input data through user interface 1900 over an Internet connection using GET, POST or AJAX procedures, for example. When processor 102 detects user interaction with respect to the copy data control 1910 processor 102 performs method 2000 in FIG. 20.

Processor 102 commences by displaying data to screen 2002 and creating AES Key for table (AES-T) 2004. Processor 102 then writes 2006 to Key Table 502 in profile 210 and encrypts AES-T 2008 with RSA-1 to create AES-TE. Processor 102 further writes 2010 to Key Table 310 in directory 206 (AES-TE) and encrypts 2012 data with AES-T. Next, processor 102 decrypts 2014 AES-TE key with RSA-2 Key to produce AES-T key and decrypts 2016 data with AES-T key. Then processor 102 encrypt 2018 data with AES-S key and creates 2020 Custom Layer in escrow 208.

Finally, processor 102 writes 2022 encrypted data to Custom Layer in escrow 208, writes 2024 to Layer Table in escrow 208 and creates 2026 column in Index Table 408 of escrow 208.

Figure 21:
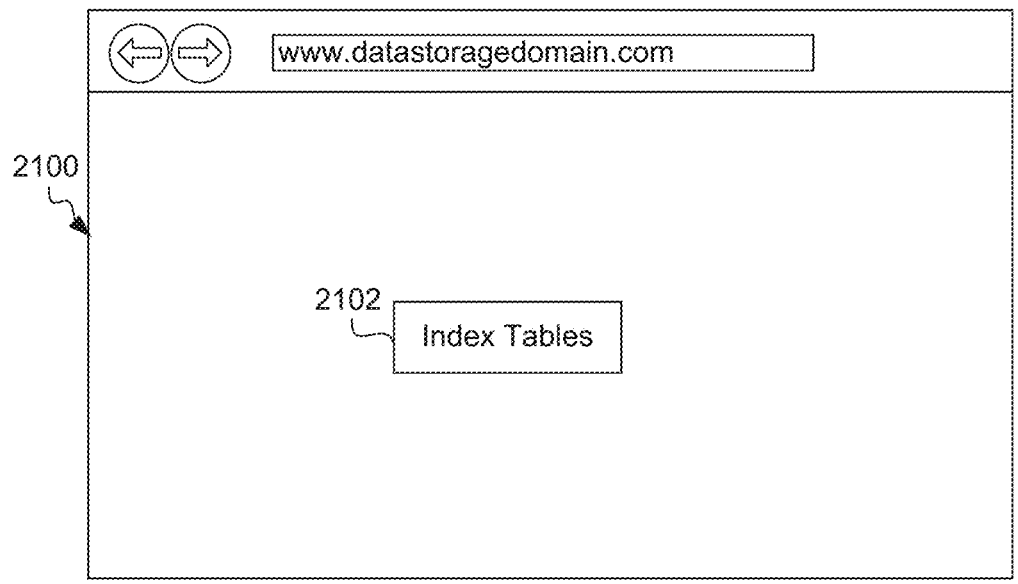
FIG. 21 illustrates a graphical user interface for initiating the indexing of tables.

FIG. 21 illustrates a further graphical user interface 2100 for initiating the indexing of tables. The user interface 2100 comprises a user control element 2102. In response to detecting user interaction with the user control element 2102, processor 102 commences performing the following method.

Figure 22:
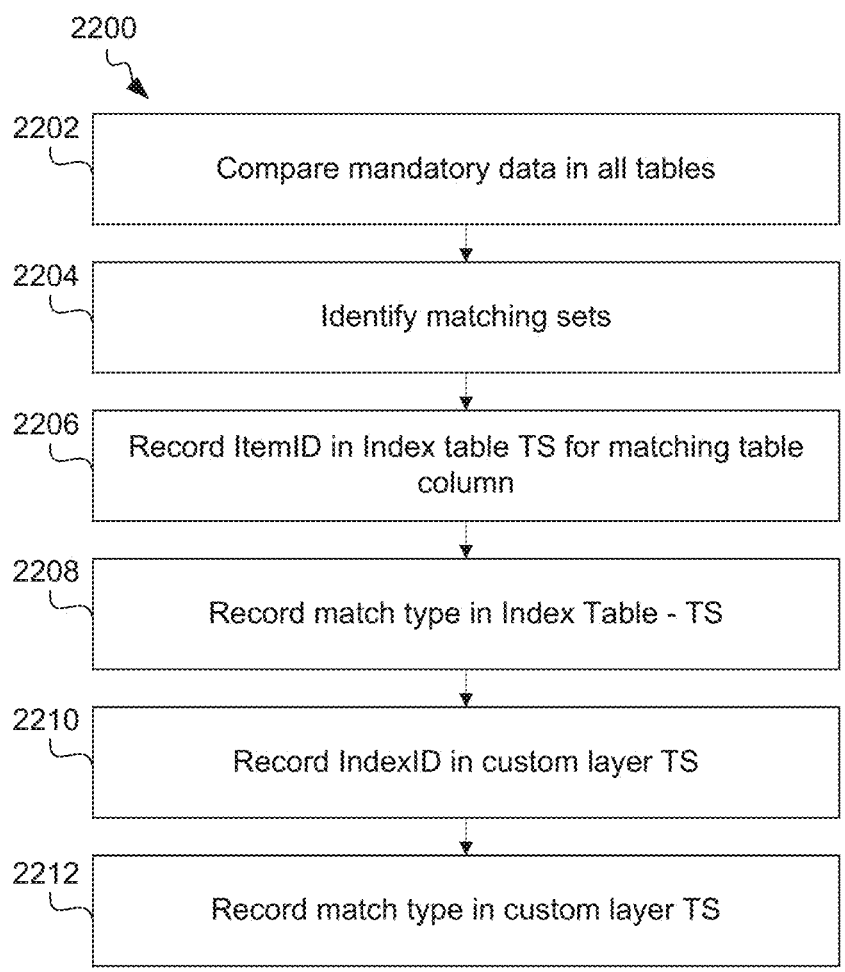
FIG. 22 illustrates a method for initiating the indexing of tables.

FIG. 22 illustrates a method 2200 for indexing a table commencing by processor 102 comparing 2202 mandatory data in all tables. Then, processor 102 identifies 2004 matching sets and records 2206 itemID in index table 408 of escrow 208 for matching table column. Processor 102 further records 2208 the match type in index table 408, records 2210 the index id in custom layer 404 and records 2212 match type in custom layer 404 as explained with reference to FIG. 7.

Figure 23:
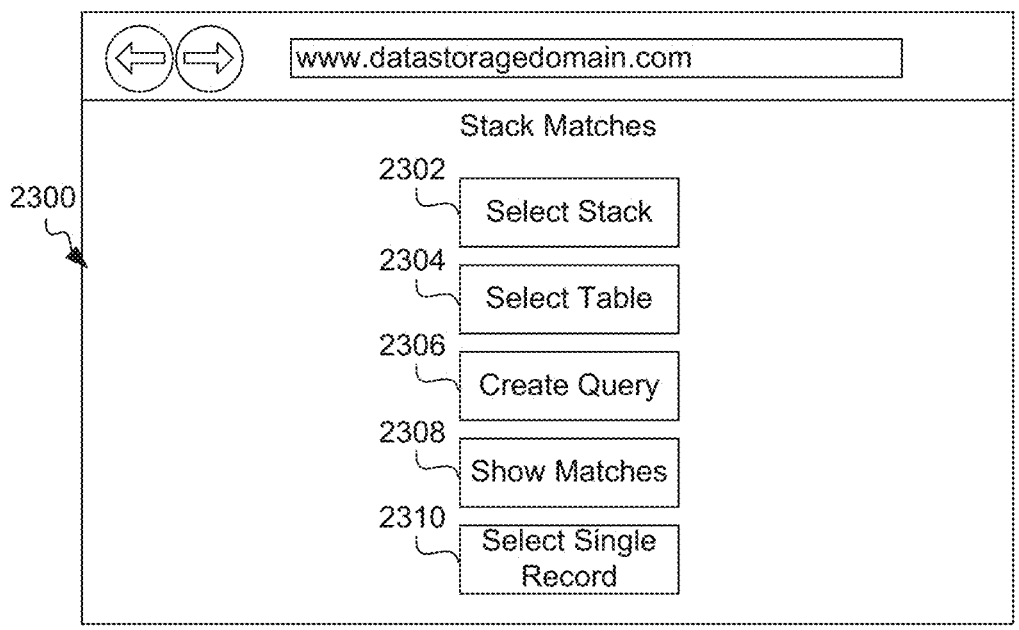
FIG. 23 illustrates a graphical user interface for matching stacks.

FIG. 23 illustrates a graphical user interface 2300 for matching stacks. User interface 2300 comprises a first input field 2302 for selecting a stack, a second input field 2304 for selecting a table, a third input field 2306 for creating a query, a control element 2308 for showing matches and a control element 2310 for selecting a single record. As above, processor 102 receives the entered data from the user interface 2300 and in response to detecting user interaction with respect to the control element 2308 performs one of the following methods depending on whether the stack is flagged as internal or not.

Figure 24A:
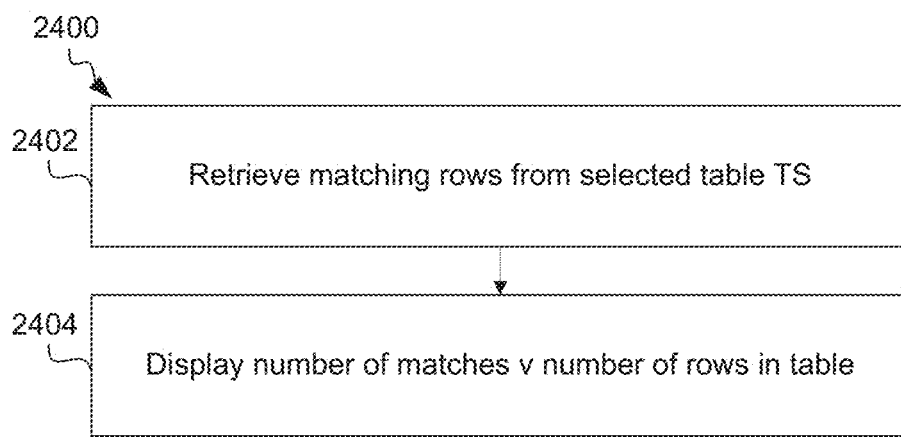
FIG. 24a illustrates a method for displaying matches for a non-internal stack.

FIG. 24a illustrates a method 2400 for displaying matches for a non-internal stack. Processor 102 retrieves 2402 the matching rows from the selected table in escrow 208 and displays 2404 the number of matches against the number of rows in the table.

Figure 24B:
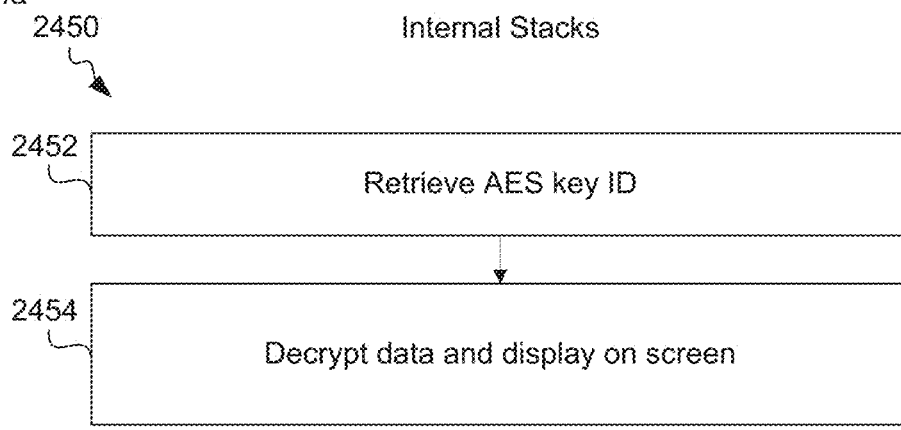
FIG. 24b illustrates additional method for displaying matches from an internal stack.

FIG. 24b illustrates additional method 2450 for displaying matches from an internal stack. Processor 102 retrieves 2452 AES key from directory 206 and decrypts 2454 the data and displays the decrypted data, such as by writing an HTML <table> structure containing the data records on data store 106 and making that table structure accessible to a browser running on a computer client.

Figure 25:
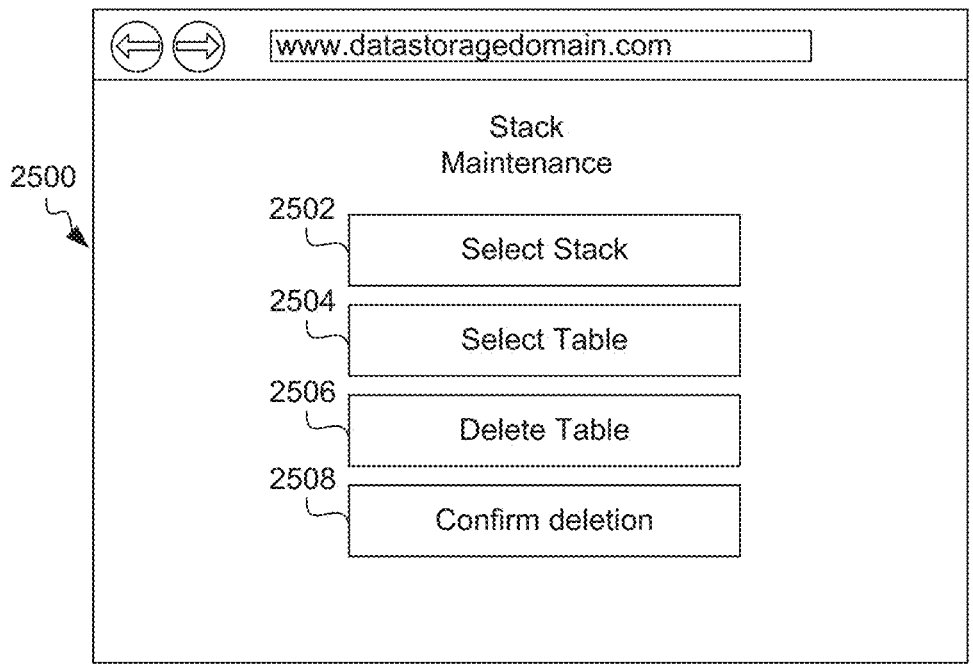
FIG. 25 illustrates a graphical user interface for maintaining a stack.

FIG. 25 illustrates a further user interface 2500 for maintaining a stack. The user interface 2500 comprises a first input field 2502 for selecting a stack, a second input field 2504 for selecting a table, a first user control element 2506 for deleting the table and a second user control element 2508 for confirming deletion. In response to detecting user interaction with respect to the first user control element 2506 and the second user control element 2508 processor 102 performs the following method.

Figure 26:
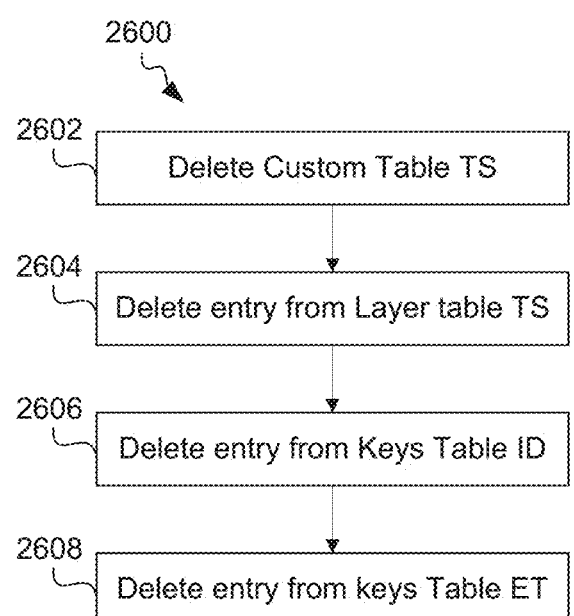
FIG. 26 illustrates a method for maintaining a stack.

FIG. 26 illustrates a method 2600 for maintaining a stack. First, processor 102 deletes 2602 the custom table 404 from escrow 208 and deletes 2604 the entry from the layer table 402. Then, processor 102 deletes 2606 the entry from the keys table 310 and deletes 2608 the entry from keys table 502.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for sharing confidential data between a first data provider and a second data provider, the method comprising:
   determining a correspondence between one of multiple first data records from the first data provider and one of multiple second data records from the second data provider,
   the multiple first data records being stored on a first data store being accessible by the first data provider and protected by encryption from the second data provider, each of the multiple first data records comprising an identifier that references a respective first data record,
   the multiple second data records being stored on a second data store being accessible by the second data provider and protected by encryption from the first data provider, each of the multiple second data records comprising an identifier that references a respective second data record; and
   creating a third data record on a third data store, the third data record comprising the identifier that references the respective first data record as a first reference to the one of the multiple first data records and the third data record comprising the identifier that references the respective second data record as a second reference to the one of the multiple second data records, wherein the identifier that references the first data record is accessible by the second data provider and the identifier that references the second data record is accessible by the first data provider.

2. The method of claim 1, further comprising receiving an indication of one or more columns of the first and second data records, wherein determining the correspondence comprises determining a match of values in the one or more columns between the first data records and the second data records.

3. The method of claim 1, further comprising storing one or both of:
   in the first data store associated with the one of the multiple first data records an indication of a match type between the one of the multiple first data records and the one of the multiple second data records; and
   in the second data store associated with the one of the multiple second data records an indication of a match type between the one of the multiple first data records and the one of the multiple second data records.

4. The method of claim 1, further comprising: receiving the multiple first data records;
   encrypting the multiple first data records to obtain encrypted first data records that are protected from the second data provider; and
   storing the encrypted first data records on the first data store.

5. The method of claim 4, wherein
encrypting the multiple first data records comprises using a first symmetric key that is protected from the first data provider and protected from the second data provider, and
the first data records are accessible to the first data provider by checking the first data provider's credentials and decrypting the first data records using the first symmetric key.

6. The method of claim 4, further comprising:
receiving the multiple second data records;
encrypting the multiple second data records to obtain encrypted second data records that are accessible by the second data provider and protected from the first data provider; and
storing the encrypted second data records on the second data store.

7. The method of claim 6, further comprising:
receiving a query value from the first or the second data provider;
encrypting the query value using the first asymmetric key to determine an encrypted query value; and
performing a query for the encrypted query value over the encrypted first data records or the encrypted second data records.

8. The method of claim 4, wherein receiving the multiple first data records comprises:
generating a key pair comprising a public key and a private key;
sending the public key to the first data provider;
receiving from the first data provider an encrypted second symmetric key that is encrypted using the public key;
decrypting the encrypted second symmetric key using the private key;
receiving from the first data provider encrypted first data records that are encrypted using the second symmetric key; and
decrypting the encrypted first data records using the second symmetric key.

9. A non-transitory computer-readable medium with instruction code stored thereon that, when executed by a computer, causes the computer to perform a method for sharing confidential data between a first data provider and a second data provider, by performing the steps of:
determining a correspondence between one of multiple first data records from the first data provider and one of multiple second data records from the second data provider,
the multiple first data records being stored on a first data store being accessible by the first data provider and protected by encryption from the second data provider, each of the multiple first data records comprising an identifier that references a respective first data record,
the multiple second data records being stored on a second data store being accessible by the second data provider and protected by encryption from the first data provider, each of the multiple second data records comprising an identifier that references a respective second data record; and
creating a third data record on a third data store, the third data record comprising the identifier that references the respective first data record as a first reference to the one of the multiple first data records and the third data record comprising the identifier that references the respective second data record as a second reference to the one of the multiple second data records, wherein
the identifier that references the first data record is accessible by the second data provider and the identifier that references the second data record is accessible by the first data provider.

10. A system for sharing confidential data between a first data provider and a second data provider, the system comprising:
a first data store to store multiple first data records from the first data provider, the first data store being accessible by the first data provider and protected by encryption from the second data provider, each of the multiple first data records comprising an identifier that references a respective first data record;
a second data store to store multiple second data records from the second data provider, the second data store being accessible by the second data provider and protected by encryption from the first data provider, each of the multiple second data records comprising an identifier that references a respective second data record;
a processor having access to the first data store and the second data store
to determine a correspondence between one of the multiple first data records and one of the multiple second data records, and
to create a third data record on a third data store, the third data record comprising the identifier that references the respective first data record as a first reference to the one of the multiple first data records and the third data record comprising the identifier that references the respective second data record as a second reference to the one of the second data records, wherein the identifier that references the first data record is accessible by the second data provider and the identifier that references the second data record is accessible by the first data provider.

11. The system of claim 10, further comprising a third data store to store the first reference and the second reference.

* * * * *